US011010321B2

(12) United States Patent
Whittington et al.

(10) Patent No.: US 11,010,321 B2
(45) Date of Patent: May 18, 2021

(54) AD-HOC SENSING SWITCHED DATA CIRCUIT FOR CONNECTING NETWORK HOSTS AND PERIPHERALS

(71) Applicant: CROSSPORT NETWORK SOLUTIONS INC., Mississauga (CA)

(72) Inventors: Christopher Whittington, Brampton (CA); Noaman Makki, Kleinburg (CA); Yunus Dawji, Toronto (CA)

(73) Assignee: CROSSPORT NETWORK SOLUTIONS INC., Mississauga (CA)

( * ) Notice: Subject to any disclaimer, the term of this patent is extended or adjusted under 35 U.S.C. 154(b) by 0 days.

(21) Appl. No.: 16/468,800

(22) PCT Filed: Dec. 12, 2017

(86) PCT No.: PCT/CA2017/051501
§ 371 (c)(1),
(2) Date: Jun. 12, 2019

(87) PCT Pub. No.: WO2018/107281
PCT Pub. Date: Jun. 21, 2018

(65) Prior Publication Data
US 2019/0370202 A1    Dec. 5, 2019

Related U.S. Application Data

(60) Provisional application No. 62/433,201, filed on Dec. 12, 2016.

(51) Int. Cl.
*G06F 13/38* (2006.01)
*G06F 13/20* (2006.01)
(Continued)

(52) U.S. Cl.
CPC ............ *G06F 13/385* (2013.01); *G06F 13/20* (2013.01); *G06F 13/404* (2013.01); *G06F 13/4282* (2013.01); *H04W 84/18* (2013.01)

(58) Field of Classification Search
CPC ............................ G06F 13/116; G06F 13/404
See application file for complete search history.

(56) References Cited

U.S. PATENT DOCUMENTS 5,581,709 A  *  12/1996  Ito ...................... G06F 13/4022
                                                        710/38
6,308,215 B1     10/2001  Kolbet et al.
(Continued)

FOREIGN PATENT DOCUMENTS

TW            200506637 A      2/2005

*Primary Examiner* — Getente A Yimer
(74) *Attorney, Agent, or Firm* — Heer Law; Christopher D. Heer; Larissa Leong

(57) ABSTRACT

A high speed single bridge system providing network and data transfer capabilities, implemented via standard input/output (I/O) devices, protocols, cables and components, to interconnect two or more host computing systems, and to provide connections to peripherals. One aspect of the invention connects two or more host systems via USB ports and cables, establishing network, control, data exchange, and power management required to route and transfer data at high speeds. A second aspect provides for a symmetrical port that senses Host and Peripheral connections so as to provide a single apparatus for connecting Hosts and Peripherals at any port. Requiring only a single link, the invention requires significantly fewer components than existing designs. The method describes how two or more connected host systems detect one another, and establish separate control communication and data exchange bridges, wherein control sequences generated by an application on a host direct operation of the bridging apparatus.

15 Claims, 11 Drawing Sheets

(51) Int. Cl.
   *G06F 13/40* (2006.01)
   *G06F 13/42* (2006.01)
   *H04W 84/18* (2009.01)

(56) References Cited

U.S. PATENT DOCUMENTS

| | | |
|---|---|---|
| 6,601,109 B1 | 7/2003 | Bealkowski et al. |
| 6,851,009 B1 | 2/2005 | Regula |
| 7,039,750 B1 | 5/2006 | Regula et al. |
| 7,085,876 B2 | 8/2006 | Lai et al. |
| 7,162,566 B2 | 1/2007 | Lin |
| 7,478,191 B2 | 1/2009 | Wurzburg et al. |
| 7,480,753 B2 | 1/2009 | Bohm et al. |
| 7,523,243 B2 | 4/2009 | Bohm et al. |
| 7,627,708 B2 | 12/2009 | Bohm et al. |
| 8,090,894 B1 | 1/2012 | Khodabandehlou et al. |
| 8,447,890 B1 | 5/2013 | LeTourneur et al. |
| 8,504,755 B2 | 8/2013 | Beadnall et al. |
| 8,543,890 B2 | 9/2013 | Dodson |
| 8,554,976 B2 | 10/2013 | Buxton et al. |
| 8,880,771 B2 | 11/2014 | Subramaniyan et al. |
| 9,047,257 B2 | 6/2015 | Aravindhan |
| 9,645,962 B2 | 5/2017 | Voto et al. |
| 2002/0156952 A1* | 10/2002 | Shono ................. G06F 13/4081 710/104 |
| 2004/0049624 A1 | 3/2004 | Salmonsen |
| 2004/0179534 A1 | 9/2004 | Pettey et al. |
| 2006/0059293 A1 | 3/2006 | Wurzburg et al. |
| 2009/0138638 A1 | 5/2009 | Russo et al. |
| 2009/0154456 A1 | 6/2009 | Dodson et al. |
| 2009/0313488 A1 | 12/2009 | Lee |
| 2011/0113079 A1 | 5/2011 | Jou et al. |
| 2011/0219163 A1 | 9/2011 | Beadnell et al. |
| 2011/0320666 A1 | 12/2011 | Gregg et al. |
| 2012/0042178 A1* | 2/2012 | Ishii ................. G06F 1/266 713/300 |
| 2013/0013823 A1 | 1/2013 | Altmayer |
| 2013/0024595 A1 | 1/2013 | Subramaniyan et al. |
| 2013/0179671 A1* | 7/2013 | Tsai ................. G06F 9/06 713/2 |
| 2013/0346660 A1* | 12/2013 | Kwidzinski ........... G06F 13/426 710/200 |
| 2014/0181325 A1* | 6/2014 | Hundal ................. G06F 13/126 710/5 |
| 2015/0019789 A1 | 1/2015 | Subramaniyan et al. |
| 2015/0067896 A1* | 3/2015 | Gundam ................. G06F 21/85 726/34 |
| 2015/0309954 A1 | 10/2015 | Moore |
| 2016/0217093 A1 | 7/2016 | Whittington et al. |
| 2017/0046289 A1* | 2/2017 | Hundal ............... G06F 13/4022 |
| 2017/0177053 A1* | 6/2017 | Browning ................. G06F 1/28 |
| 2018/0285308 A1* | 10/2018 | Liu ....................... G06F 13/385 |

* cited by examiner

AD-HOC SENSING SWITCHED DATA CIRCUIT FOR CONNECTING NETWORK HOSTS AND PERIPHERALS

FIELD OF THE INVENTION

The present application relates generally to the establishment of data networking and device interconnections using peripheral I/O protocols, components and cables; and having a preferred implementation that leverages Universal Serial Bus (USB) peripheral protocol, cables, and components. The present application also illustrates a sensing device hub circuit supporting USB Host to Host and Host to multi-Host networking and high-speed file transfers, whilst providing inline access to peripheral connections on a dedicated, switched or shared basis. An aspect of the described method includes employing a combination of physical and virtual links to establish a network by bridging I/O device connections.

BACKGROUND OF THE INVENTION

Peripheral communications protocols provide the ability to connect peripherals directly to the CPU of a Host system. Most modern peripheral communications protocols provide ultra-high-speed connections for the transfer of data to meet the requirements of modern CPUs. Popular peripheral protocols or specifications include the Universal Serial Bus (USB) and the Peripheral Component Interconnect (PCI), among others. USB is a globally accepted and widely used plug-and-play interface for peripheral devices such as digital cameras, scanners, printers, Compact Disc (CD) players, Digital Versatile Disc (DVD) players, as well as modern game consoles, etc.

USB connections continue to evolve, providing improvements in high speed data transfer with power delivery. The third version of the USB Specification (hereinafter "USB 3"), introduces multiple advantages over previous versions and other protocols, including full duplex communications, a flexible and reversible port (Type-C), as well as a first-generation mode (Gen 1) that delivers high speed data rates of 5 Gbps (Gigabits per second) and a second-generation mode (Gen 2) that delivers 10 Gbps. A second revision of the USB Specification, USB 3.2, introduces simultaneous parallel data transfers of the earlier augmented speeds, and provides up to 20 Gbps in a single connection.

Input/Output ('I/O') Communications, also called Peripheral Communications, define implementations of simple fast data communications between a "Master" System and a "Slave" Device; also called Host-to-Device communications. The present application employs the terms 'Host' to refer to a Master System and 'Device' to refer to a connected slave apparatus; consistent with a reference to Universal Serial Bus specifications. Embodiments of the present application may alternatively employ other I/O Communications protocols wherein a Master and Slave relationship is established in a direct connection.

An initial publication of the third USB specification (USB 3.0) defines the use of a direct link USB 3 Male-A to Male-A Crossover cable, which does not include the Vbus or Bus Power contingent, designed primarily for connecting two Hosts for the purposes of diagnosis and other restricted uses.

A USB Host to Host connection cable is available for USB 3, wherein two data buffers are arranged in bridge formation, further employing a bridging Microcontroller to copy data from a first buffer to a second. Effective speed of these USB 3.0 Host to Host cables using this method is reported to be approximately 30 to 60 MBps, depending on available power. This is a significant reduction from the available 480 MBps provided by the USB 3 specification.

Other implementations of I/O multi-port fabrics and data transfer platforms, such as PCI fabrics by PLX/Avago, similarly employ active manipulations of directed communications over bridging devices between multiple I/O ports; introducing significant latency, power and component costs. Specifically, data is directed by an initiating host from an originating port to an identified target port.

The nature and implementation of the present disclosure may equally be employed for East-West server communications using Gen-Z, PCIe, SCSI and other ultra-high-speed in/out ('I/O') device connections. In doing so, the present application offers significant benefits in security, transfer speed, solutions cost and scalability.

A first revision of the third USB specification defines a USB Type-C connector and port and provides for detecting valid cable connections wherein Type-C connectors at both ends of a cable. As such, host-to-host and peripheral-to-peripheral connections are physically possible but not supported. Valid connections are detected and acted upon; if two hosts or two peripherals are connected, nothing will happen. Orientation of a cable and signaling requirements are detected from receptacle and plug connections and routing is configured for correct communication regardless of plug orientation. This first revision further improves direct system interconnections via an augmented USB-On-The-Go that provides that a smaller system will appear as a peripheral when connected to a larger system, according to pre-defined rules.

Type-C ports can be host-only, peripheral-only or dual-role ports. The host-only and peripheral-only ports function in the traditional USB host and peripheral roles; the host being the system connected to the downward facing port (DFP) and the peripheral system connected to the upward facing port (UFP). Type-C identifies these roles electronically, instead of having functionally shaped connectors. Also, the dual-role ports can be reconfigured: for example, a laptop may function as an UFP when being charged by a monitor or a DFP when powering a hard drive.

Type-C hubs, defined by the first revision, can be used to increase DFP capabilities, but may only have one UFD port, which must be clearly marked, and one or more DFPs. The UFP cannot be a dual-role port and alternative/accessory modes are not handled by hubs. Despite marking a UFP, it is expected that users will confuse UFP and DFP ports and will further desire multiple UFP capabilities, and integrated data transfer capabilities.

U.S. patent application Ser. No. 14/917,402 having a priority date of Dec. 8, 2013, hereinafter the "LINKS Patent", illustrates a method and apparatus for bridging device I/O links to establish ultra-fast file transfer and network communications between connected Hosts. Employing two parallel bridging I/O links, the invention provides an efficient and adaptive communications platform using commodity components, common ports and universal protocols.

BRIEF SUMMARY OF THE INVENTION

The present application discloses a method and apparatus for establishing an Ad-hoc Switched Circuit selectively providing dedicated, shared or switched peripheral connectivity, as well as peered network communications and high-speed data transfer capabilities between two or more coupled Host computers (hereinafter "Host" or "Host system" or "USB Host system") employing standard peripheral connections, in bridged configuration.

Implementations employing the USB 3.0 SuperSpeed protocol provide for network and file transfer speeds of the same order of magnitude as the basic USB 3.0 specification. Similarly, the use of USB 3.1 Enhanced SuperSpeed protocol and components can achieve speeds of the same order of magnitude as the basic USB 3.1 specification, and parallel connection support in USB 3.2 specifications provide for speeds of the same order of magnitude as the basic USB 3.2 specification. Implementation of composite USB 3.2 connections at either end of a bridge further offers the capability for a switched 4-port USB 3.1 use.

Implementations of the present application, according to various embodiments, provide for direct, shared or switched access to connected peripherals on DFPs.

Implementations of the present invention, according to various embodiments, provide for heterogeneous connections between hosts and peripherals connected to the bridging apparatus, and controlling peripherals via proxied or delegated control across a bridged bus connecting multiple hosts. In this way, it is envisioned that a Host employing a PCIe connection to an embodiment of the proposed apparatus might affect control over a USB peripheral enumerated and shared or delegated via a second host. It is further shown that this second or proxying host may be embedded within the bridging device, serving to act as an enabling host for downstream peripheral connections.

Employing an embodiment of a proposed apparatus, methods and system detailed herein, hosts and peripherals are detected across several unmarked ports, optionally establishing multiple UFP connections, each fully compliant electronically and logically with an applicable communications protocol. Simultaneously, each connected Host may detect the one or more other hosts and establish a network link consisting of a single physical bridged path for network, control, and high-speed data transfer. Power may be further exchanged over connections to the bridging device according to communications protocol rules and accommodations. Host systems may employ one of several available protocols providing detection, negotiation, link, service, flow direction, high speed data transfer management, and power management.

According to an aspect of the present disclosure, a method for transferring data over a single data link is established between a first universal serial bus Host and a second universal serial bus Host, wherein identifiable control blocks are defined, implemented and interpreted to establish a virtual control link. The present application illustrates a working implementation of a virtual control link over an established data link, wherein only one I/O device is required at each end of a shared bridging bus, and a control bridging bus is further supported without a physical implementation as required by the LINKS Patent.

The advantages of the herein-disclosed apparatus are not without cost to overall performance of network and file transfer communications. Disadvantages to the present invention presented herein are illustrated to be minor except in the most complex and demanding implementations. Fundamental to the design described herein, the full capability, capacity, and efficiency, of a single data communications link is shared with a control path establishing network communications between coupled Hosts. As such, transfer performance is expected to be less than the multi-link bridged network disclosed in the LINKS Patent; nevertheless, performance will be affected only to the degree to which new transfers are initiated, and when transfers are few and large they will complete with negligible difference in performance.

According to another aspect of the present disclosure, there is provided an apparatus for connecting a first Host and a second Host. The apparatus includes a high speed switched data circuit over a data bridge, a switching manager adapted to create temporary interconnections between a first universal serial bus Host and one or more subsequent universal serial bus Hosts, a Network and Control Manager adapted to establish addressing and network switching, and a Data Control Manager to direct the Data Exchange mechanism to transact Data and File Transfers between the connected universal serial bus Hosts.

According to an aspect of the described apparatus, a host switch apparatus, having multiple unmarked ports, further contains a standard hub for connecting peripherals, and a detector to detect that a host device or peripheral device has been coupled to the apparatus on any available port.

According to an aspect of the present disclosure, a Detector is added after the bridging device Port Controller, but before the control and transfer I/O devices, with the object of discerning if a connection is from a peripheral or a host. In many cases, a Detector function may need only be programmed within an existing Port Controller to extend the capabilities envisioned in the applicable specification. Connections from a Host may be connected to the UFP of an embedded hub, or connected to a bridging bus or, via an embedded host controller, selectively connected to both a shared bridging bus and UFP of a hub.

Similarly, according to an aspect of the present disclosure, a Detector is added after the bridging device Port Controller, or programmatically included within an existing Port Controller and extending the functionality described in the applicable specification, wherein a peripheral may be connected to any unmarked port and routed to a DFP of an embedded hub. Consistent to the application of a relevant communications protocol, peripheral to peripheral connections are not supported.

BRIEF DESCRIPTION OF THE DRAWINGS

A more complete understanding of aspects of the present application is to be derived from the detailed description provided herein and from the accompanying drawings of embodiments of the present application, which, however, are not to be understood as limiting the application to the specific embodiments as detailed, but are for the purposes of illustration to help better explain and for clarity in understanding the present application. Reference will now be made, by way of example, to the accompanying drawings in which.

DETAILED DESCRIPTION OF THE EMBODIMENTS

Figure 1A:
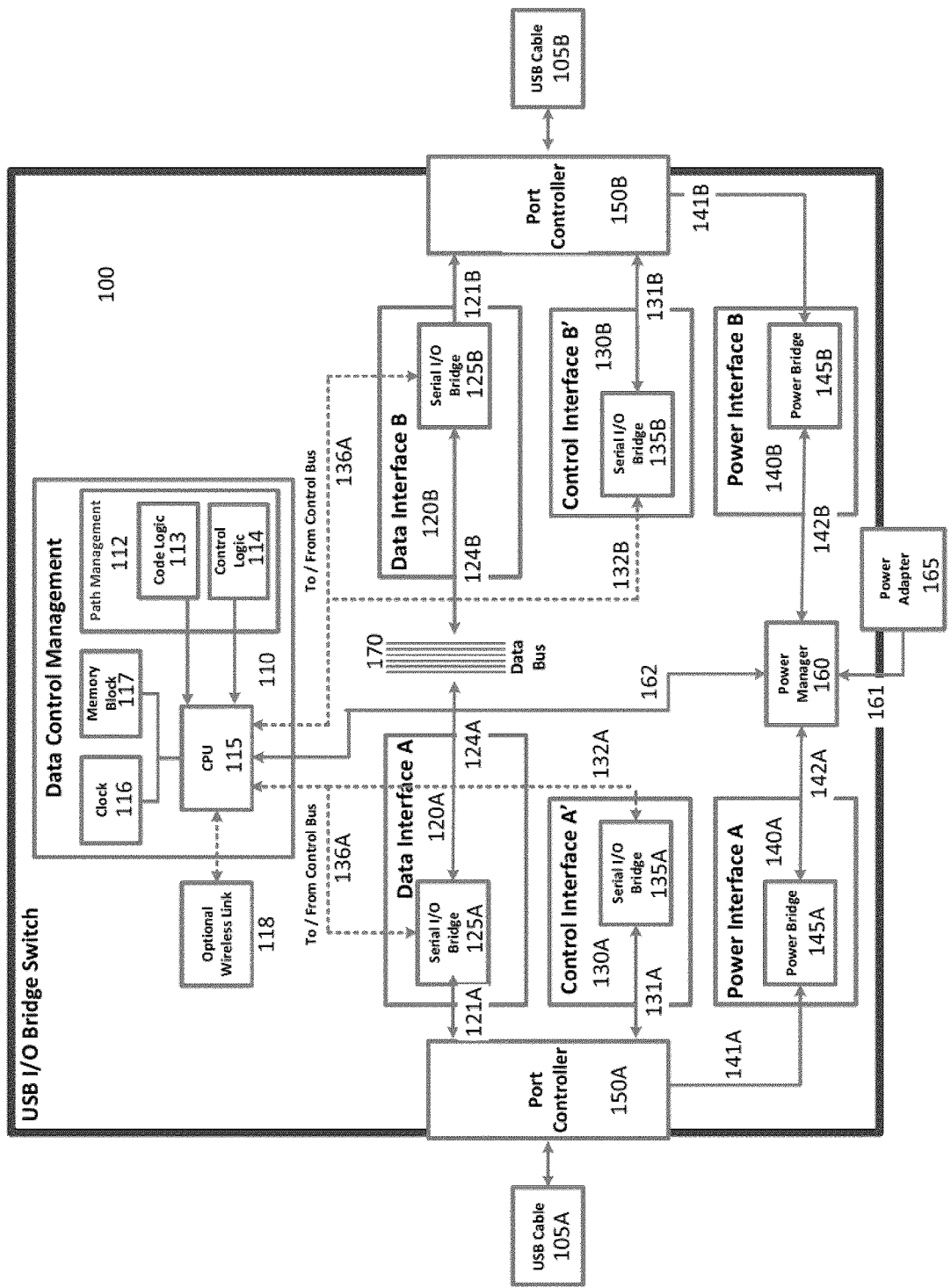
FIG. 1A illustrates, in a schematic diagram, an embodiment of an Integrated USB I/O Bridging Switch.

Aspects of the present application, in some embodiments, wherein the peripheral communications protocol, and supporting connectors, I/O devices, linking mechanism and components are described in reference to an implementation of the USB protocol, may equally refer to another peripheral communications protocol such as PCI, and its derivatives, SCSI or other communications protocols designed for Host to peripheral communications.

Aspects of the present application, in some embodiments, wherein Host is synonymous with Host system and USB Host, relate to USB Host to Host and Host to multi-Host communications and networking as established by the LINKS Patent.

Aspects of the present application, in some embodiments, relate to a bridging device and establishing a working implementation of a virtual control link over a physical data link using an identifiable message block within an established data link; with applicable communications protocol host logic applied at a Host, and device logic implemented in the bridging device.

Aspects of the present application, in some embodiments, provide for processing capability and memory external to, and shared amongst, each connected I/O device to reduce the cost and complexity of a bridging apparatus containing a data bridging bus. This centralized device bridge intelligence, acting independently to connected host systems, provides shared network control and security aspects to I/O devices, effectively ignoring the data bridging bus. In such a manner, a simple USB FIFO (first in first out) bridge may replace a fully programmable USB controller, offering significant advantages in cost and complexity aspects. Previously defined as fully capable Network Interface Controllers (NICs) in the LINKS Patent, multiple pairs of connected I/O devices, each pair being a serial I/O control device and a serial I/O transfer device, are thereby reduced to single protocol translators; transferring all networking aspects to a centralized logic processor and memory, acting on behalf of all connected I/O devices.

Aspects of the present application describe a method for selectively establishing an upward facing port (UFP) from any port on a bridging device, whilst maintaining electronic and logical compliance to an applicable specification.

In some embodiments of the present application, an embedded Host controller running Host logic and bridging software prescribed by the earlier LINKS patent, when connected on a UFP of an embedded Hub, is described to provide multiple UFP connections on a single multi-port Hub, from any enabled port; wherein logic running within connected Host Systems and the bridging Apparatus selectively establish communications between a connected Host and one or more peripherals on a DFP. In this way, a peripheral on a DFP may be assigned to a connected host on a dedicated basis.

In some embodiments of the present application wherein an embedded Host controller connects to peripherals via an embedded hub, and, by virtue of being connected as a host to a bridging bus and joining a software constructed network, may selectively expose, or switch, a peripheral from one Host to another networked Host System. And, whereas existing switched hubs employ electronic switching to arbitrate between connected hosts, the present application describes a selectable host proxy arrangement, whereby the host controller logic employed within the bridging apparatus employs the effect of switching control between Host and Bridging Apparatus, without altering electronic signaling and enumerations.

In some embodiments of the present application, wherein an embedded Host controller connects to peripherals via an embedded Hub, and wherein, by virtue of being connected as a host to a bridging bus and joining a software constructed network, an embedded host may further share a connected peripheral resource to one or more networked Host Systems. In this way, a USB camera may stream to multiple connected systems, and be available to be controlled by each; such sharing being arbitrated by logic running on the bridging device apparatus, again without altering electronic signaling and enumerations.

In some embodiments of the present application, a first port designated as a host connection port, having detected a host connection, connects firstly to the UFP of an embedded Hub, and secondly to a bridging bus via downstream bridging device controller acting as a network interface controller. In this way, a peripheral on a DFP of an embedded hub may be logically delegated, switched or shared with another host coupled to the bridging bus and established as part of a network established by a LINKS method.

In some embodiments of the present application, a Selector is added between a Port Controller and the I/O devices of a bridging device, the selector capable of detecting a connection by either a host or a peripheral, wherein the Selector is applied to a host connection and provides a selective connection to either the UFP of an embedded hub or to a bridging device controller acting as a network controller coupled to a shared bridging bus. Implemented with a first connection rule, any first port having a host connection and selecting an option for a Hub, could connect to the UFP of an embedded Hub and enumerate any peripheral on a DFP. Selector settings may be further set, or reset, by virtue of communication over a control link, or additionally by logical activity in a shared processing aspect on the bridging device apparatus. Such an implementation may be more limited in its capability than earlier implementations but may serve to offer temporary access to a Hub from any available port connection.

Aspects of the present application further provide for the creation of one or more switched circuit communications between heterogeneous protocols and connectors; this is understood to be increasingly important with the use of the Type-C cable offering composite connections and supporting multiple protocols.

Terms such as "coupled" and "connected" used herein, may be replaced by any derivative such as "bridged." Although seemingly having a similar contextual definition, these terms are not intended as interchangeable replacements for one another. More specifically, in particular embodiments, "connected" may be used to indicate that two or more entities and/or elements and/or units are in direct physical or electrical contact with each other, wherein "Coupled" and/or "Bridged" may mean that two or more entities are in direct physical or electrical contact; and where "Coupled" and/or "Bridged" may also mean that two or more entities and/or elements and/or units are not in direct contact with each other, but exist and/or interact in a co-operative bind with each other.

Terms such as "block" and "unit" are used herein, may be replaced by any derivative such as "element." Although seemingly having a similar contextual definition, these terms are not intended as interchangeable replacements for one another. More specifically, in particular embodiments, "block" may be used to indicate that two or more entities and/or elements and/or units are in relation to one another, wherein "unit" may mean two or more entities and/or elements and/or units are in relation to one another and that two or more entities and/or elements and/or units are not in relation to one another other, but exist and/or interact in a co-operative bind with each other.

Some aspects of the present application may be implemented in one or any combination of hardware, firmware, and software. Some embodiments may employ a computing platform to perform the operations described herein whereby instructions may be read and executed after having been stored on a machine-readable medium. Machine-readable media may include any mechanism that can store and/or transmit information in a form readable by a machine (for example, a computer). For example, a machine-readable medium may include one or more of the following: read-only memory (ROM); random-access memory (RAM); magnetic disk storage media; optical storage media; flash memory devices; electrical, optical, acoustical or other form of propagated signals (for example carrier waves, infrared signals, digital signals, the interfaces that transmit and/or receive signals, etc.), and others.

Accordingly, while some diagrams may have been used herein to describe particular embodiments and/or implementations thereof, the present application is not intended to be limited to those diagrams and/or to corresponding descriptions herein. That is to say, the indicated movement or direction of any process or connection need not to be with or through each illustrated box or connection point or entity, and need not to be in exactly the same order as illustrated and described herein.

Accordingly, with regards to each system shown in a figure herein, the elements within the figure, in some cases, may each have a same or a different reference number, so as to suggest that the elements represented could be similar, same and/or different. Notwithstanding, an element may be flexible enough to have different implementations and remain working with some or all of the systems shown or described herein. The various elements shown in the figures, may be the same or different. Which one is referred to as a first element and which is called a second element is in some cases arbitrary.

Aspects of the present application may be considered to relate to a dual interface, such that some aspects may be implemented physically as a peripheral, these aspects may then appear as a Host at the Application level, thereby provisioning a Virtualized Host system with the ability to connect to peripherals and other Hosts, both physical and virtual.

The described implementations herein of the present application are intended to be examples only. Alterations, modifications and variations may be effected to the particular implementations by those skilled in the art without departing from the scope of the application, which is defined by the claims appended hereto.

FIG. 1A illustrates, in a schematic diagram, an embodiment of a USB Bridged Switch Apparatus 100. USB Bridged Switch Apparatus 100 may include connections from USB cable pairs 105A and 105B to Port Controller units 150A and 150B, respectively. Apparatus 100 also provides for a Data Link 121A and 121B, a Control Link 131A and 131B, and a Power Link 141A and 141B, respectively, to each of Port Controller units 150A and 150B.

Data Links 121A and 121B connect Port Controllers 150A and 150B to Serial I/O transfer devices 125A and 125B, respectively, as part of Data Interfaces 120A and 120B, respectively; ultimately connecting directly to a Data Bus 170 over direct connections 124A and 124B, respectively. In some embodiments, a Data Bus 170 may be established via parallel I/O, FIFO bridge or other direct and indirect ultra-high-speed data connections.

Power Links 141A and 141B connect to Power Bridges 145A and 145B, respectively, within Power Interfaces 140A and 140B, respectively, on each side of Apparatus 100; ultimately connecting to a Power Manager 160, which in turn connects to a Central Processing Unit 115, hereinafter "CPU", over a connection 162, and optionally to a Power Adapter 165 over a connection 161. In some embodiments, power may be supplied or drawn from Power Links 141A and 141B as available or required by connected Hosts.

Control Links 131A and 131B connect to Serial I/O Control devices 135A and 135B, respectively as part of Control Interfaces 130A and 130B, respectively, wherein a Control transmission is decoded from an employed I/O protocol, such as USB, into bits, and is connected to CPU 115 over an internal connection 132A or 132B.

Data Links 121A and 121B connect to Serial I/O transfer devices 125A and 125B, respectively, as part of Data Interfaces 120A and 120B, respectively, wherein a Data transmission is decoded from an employed I/O protocol such as USB, into bits, and wherein each Serial I/O transfer device is affixed to a bridging Data Bus 170 via direct connections 124A and 124B. In some embodiment, the direct connections 124A and 124B may selectively read from the Data Bus 170 as required by the Serial I/O transfer devices 125A and 125B in the Data Interface 120A and 120B, as prescribed by the Data Control Management block 110, over a control link 136A and 136B.

The Data Control Management Block 110 may be comprised of various elements; a Memory Block 117, a Clock 116, and CPU 115, each of which is communicatively connected to each other and interfacing with a Code Logic Block 113 and an Optional Control Logic block 114. Code Logic Block 113 and Optional Control Logic Block 114 may be located in a Data Control Management Block 110, specifically in Path Management Block 112. Additionally, the CPU 115 may be optionally connected to a Wireless Link Transceiver 118. Wireless Link Transceiver may be provided to replace a Control Link, employ an additional Security Link, or in support of additional features.

As is illustrated in FIG. 1A, the Data Control Management block 110 may facilitate a means by which a connection management system may be deployed to bridge USB Host system communications across the Apparatus 100 for the purpose of interconnecting with and to other coupled USB Hosts systems. The Data Control Management block 110, may function as a traffic manager, wherein various communication paths physical and virtual are established when USB Host systems are coupled through the Apparatus 100 with each communication path having specific and distinct operating functions and processes.

The Data Control Management block 110 may receive and issue commands. Additionally, the Data Control Management block 110 may detect and negotiate with the various coupled USB Host systems together with Code Logic 113, Path Management 112, and other coupled USB Hosts and/or peripherals.

The Data Control Management block 110 as shown in FIG. 1A may also interact with Data Interfaces 120A, 120B, specifically Serial I/O transfer devices 125A and 125B, to enable fast bus communications for ultra-high-speed data and file transfers over a bridging Data Bus 170, with the Serial I/O transfer devices performing data direction selection and path routing and switching; and executing data flow and data speed alterations as instructed by the Data Control Management block 110. The Data Interface units 120A and 120B may accommodate transfers of command and control instructions and data, but do so in an embedded serial capacity, thereby facilitating their main service, which is specifically to provision USB and USB 3 high speed data and file transfers.

By contrast to referenced art, Data Control Management block 110 is shared amongst the Data Interface blocks 120A and 120B, and further with Control Interface Blocks 130A and 130B, so as to provide data direction selection and path routing and switching, and executing data flow and data speed alterations according to Control Transmissions issued by connected Host Systems on either side of the Apparatus 100. Interacting with a connected Host via a Control Interface so as to control and manage a Data Interface, the Data Control Management block completes the aspects described in the LINKS Patent as a USB Network Interface Controller.

Figure 1B:
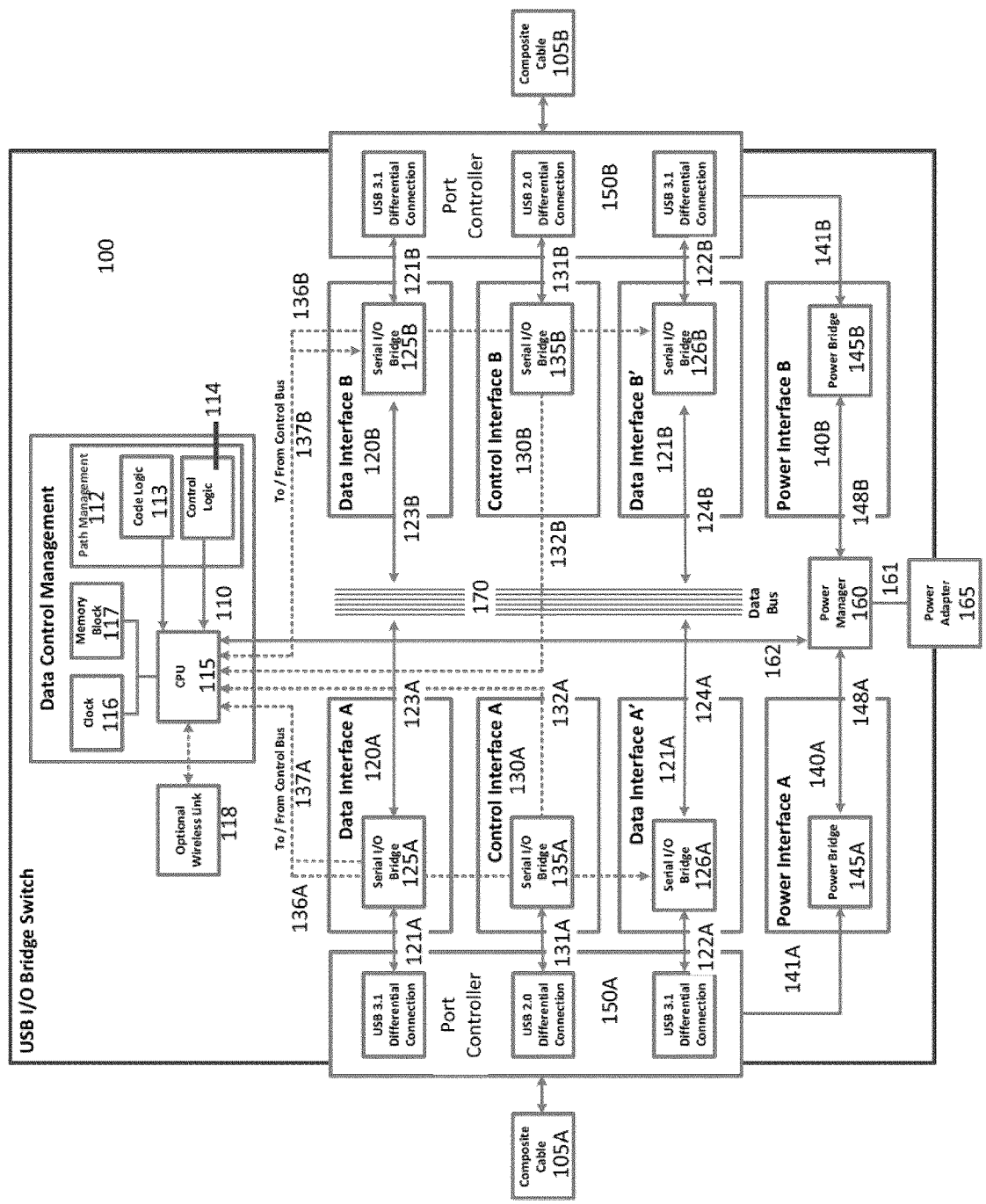
FIG. 1B illustrates, in a schematic diagram, an embodiment of an Integrated USB I/O Bridged Switching Apparatus employing a composite cable.

FIG. 1B illustrates, in a schematic diagram, a Composite USB I/O Switching Apparatus 100 in accordance with aspects of the present application; implementing parallel aspects provided by a second revision of the third USB specification (USB 3.2). As illustrated the Composite USB I/O Switching Apparatus 100 may include Data Control Management 110, USB Data Interface Units 120A, 120B, 121A and 121B, Control Interface Units 130A and 130B, and Power Interface Units 140A and 140B. In accordance with aspects of the present application the Composite USB I/O Switching Apparatus 100 may establish a composite Data Link across the Data Bus 170 for bridging USB I/O connections.

Power Bridge Units 145A and 145B may provide Vbus Power and or optionally provided external power to the shared Power Bus (not shown) via the Power Manager 160 as directed by the USB Host system application, should the need be presented. The various elements of the Composite USB I/O Switching Apparatus 100 may further include the establishment of a connection from the Control Logic block 114, to establish Control Links, 136A, 136B, 137A, and 137B, to the Data Interface blocks, 120A, 120B, 121A, and 121B, in parallel on each side of the bridging Data Bus 170. In some embodiments, Power may be provided to one or more connected hosts, particularly where a Switching Apparatus 100 is connected to at least one power source; and which includes an external power supply connection.

Power Links 141A and 141B connect to Power Bridges 145A and 145B, respectively, within Power Interfaces 140A and 140B, respectively, on each side of the Apparatus 100; ultimately connecting to a Power Manager 160, which in turn connects to a CPU 115 over a connection 162, and optionally to a Power Adapter 165 over a connection 161. In some embodiments of the presented art, connections support the transmission of power as well as system communications.

Control Links 131A and 131B connect to Serial I/O control devices 135A and 135B, respectively, as part of Control Interfaces 130A and 130B, respectively, wherein a Control transmission is decoded from an employed I/O protocol such as USB, into bits, and is connected to CPU 115 over an internal connection, 132A or 132B.

Data Links 121A, 121B, 122A and 122B connect to Serial I/O transfer devices 125A, 125B, 126A and 126B, respectively, as part of Data Interfaces 120A, 120B, 121A and 121B, respectively, wherein a Data transmission is decoded from an employed I/O protocol such as USB, into bits, and wherein each Serial I/O transfer device is affixed to a bridging Data Bus 170 via direct connections 123A, 123B, 124A, and 124B, respectively. In an embodiment of the application, the direct connections 123A, 123B, 124A and 124B may selectively connect to/disconnect from the Data Bus 170 as required by the Serial I/O transfer devices 125A, 125B, 126A, and 126B in the Data Interfaces 120A, 120B, 121A, and 121B, respectively, as prescribed by the Data Control Management block 110 over a control link 136A, 136B, 137A and 137B, respectively.

The Data Control Management Block 110 may be comprised of various elements; a Memory Block 117, a Clock 116, and CPU 115, each of which is communicatively connected to each other and interfacing with a Code Logic Block 113 and an Optional Control Logic block 114. Code Logic Block 113 and Optional Control Logic Block 114 may be located in the Data Control Management Block 110, specifically, in a Path Management Block 112. Additionally, the CPU 115 may be optionally connected to a Wireless Link Transceiver 118, with Wireless Link Transceiver 118 provided to replace a Control Link, employ an additional Security Link, or in support of additional features. The Data Control Management Block 110 may be further connected to the Power Manager 160, via the CPU 115 established earlier.

The Data Control Management block 110 as shown in FIG. 1B may also interact with Serial I/O transfer devices 125A, 125B, 126A, and 126B to enable fast bus communications for high speed data and file transfers over a bridging Data Bus 170, with Serial I/O transfer devices 125A, 125B, 126A, and 126B performing data direction selection and path routing and switching; and executing data flow and data speed alterations as instructed by the Data Control Management block 110. The Data Interface units 120A, 120B, 121A and 121B may accommodate transfers of command and control instructions and data, but do so in an embedded serial capacity, thereby facilitating their main service, which is specifically to provision USB and USB 3 high speed data and file transfers.

In some embodiments, USB I/O Switching Apparatus 100 may be a composite apparatus, and may employ a Primary USB communication and a parallel alternate ('ALT') communication, wherein the USB communication and the ALT communication are bridged and switched in parallel over a composite cable.

Figure 2:
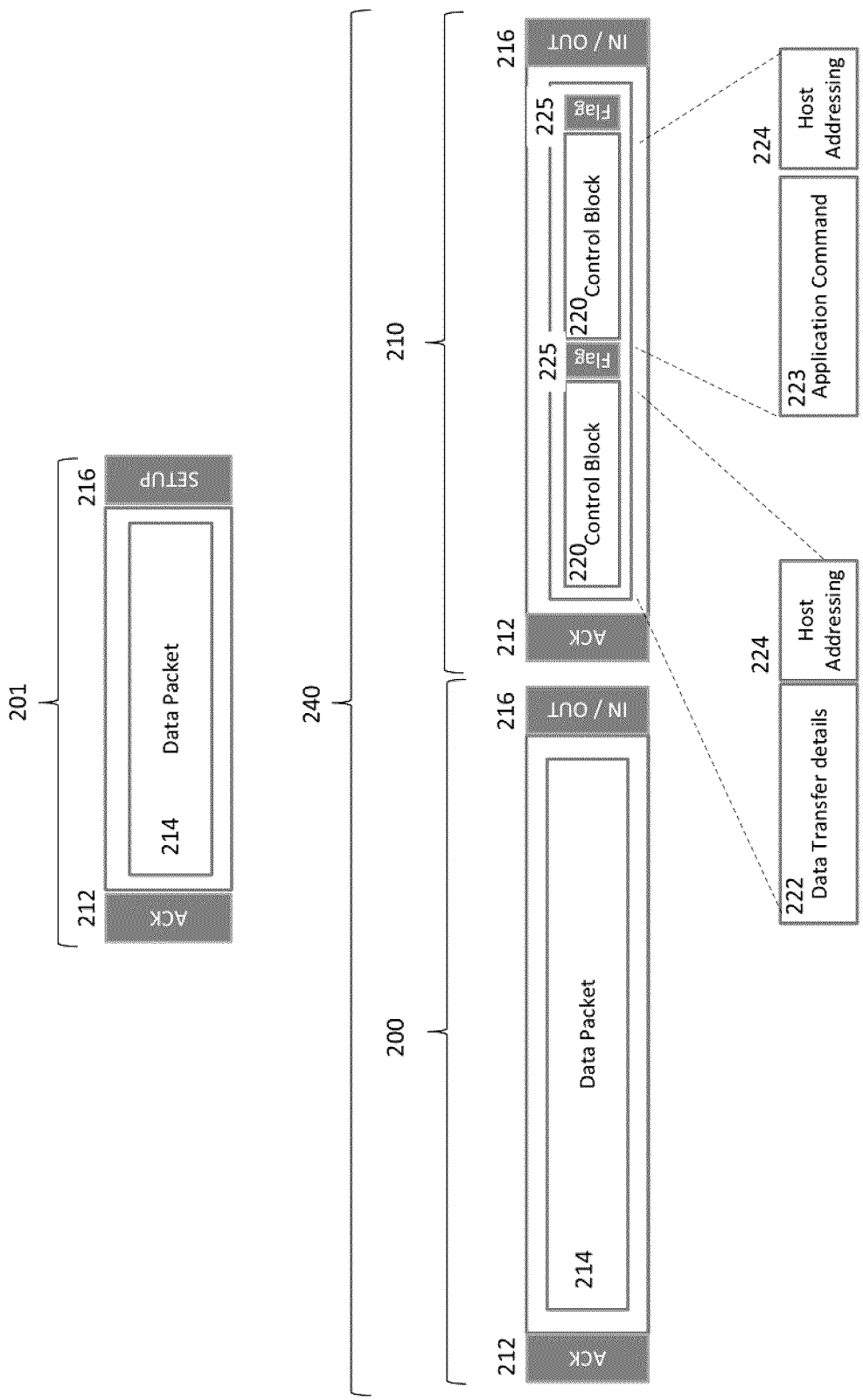
FIG. 2 illustrates, in a schematic diagram, an embodiment of I/O communications including Control and Network commands.

FIG. 2. illustrates aspects of the present application wherein separate and distinct paths are established across a USB I/O Switching Apparatus using a single physical connection establishing a virtual Control Link using a Data Link whilst maintaining the integrity of the USB protocol employed.

An aspect of an embodiment is shown, illustrating a modification of a standard USB data stream 201, for example a USB Bulk Transfer. As illustrated, a standard messaging block 201 is made up of a Handshake Token 212, IN/OUT token 216, and a Data Packet 214.

An aspect of the application is illustrated wherein protocol messaging packets 200 and 210, are shown to include provisions for establishing a virtual control link without impact on the employed USB I/O protocol, as an example. A Data Transfer 240 is illustrated as, in some embodiments, a USB 3.0 Bulk transfer; comprising a Control Messaging Block 210 containing embedded data establishing a control, and one or more Data Messaging Blocks 200 containing data to be transferred. Messaging blocks 200 and 210, as defined by an I/O specification, and for example USB 3.0, are presented. Preceded by a IN/OUT Token 216 and terminated with a Handshake Token 212, data is transferred via standard Data Packets 214.

An embodiment of the present application is shown in a Data Transfer 240, wherein one or more Control Blocks 220 are included in a control messaging block 210, of fixed or flexible length subject only to the restrictions of the employed I/O protocol, and preceded by a Flag 225. This is similar, in some regards, to USB Attached SCSI (UAS or UASP) where storage control blocks may be added or otherwise employed, within a USB data stream, to optimize storage data handling routines in a SCSI drive. Within the embodiment described herein employing USB 3.0, Interrupt Transfers are not specifically employed, except as prescribed for in standard USB communications.

In some embodiments, address data in a Host Addressing block 224 is extracted, interpreted and acted upon by the Data Control Management block 110. Aspects of the present application provide that a Control Block 220 may include Host Addressing data 224 and Application Command Data 223. Further, a Control Block 220 may contain Host Addressing data 224 with Data Transfer Details 222. In each case, a Control Block 220 may contain data that, when received and interpreted by a Data Control Management block 110 via a Control Interface, such as control interfaces 130A and 130B, may be employed to establish a Control Link between Hosts. FIG. 2 shows the inclusion of Application Command data 223 and Data Transfer Details 222 within the Control Blocks 220 that may be instantiated and interpreted via CPU 115 to determine the Host addressed by Host Address 224, and according to machine code data that may be stored in the Code Logic block 113, and relating to configuration, process execution, creation of control paths and handling instructions.

In some embodiments, as a double-blind routing arrangement, neither the sending host nor the routing host knows the physical routing information; only the abstracted ID stored in the host application. The routing information is valid only on each segment to relate to information about the subsequent segment; that is, Switching Apparatus 100 may intermediate the addressing and provide routing pointers relevant only to one connected host. For example, Host A is told Host B is 1234, while Host B thinks it is 4567. The Switch Apparatus 100 maintains that Host B sees itself as 4567 and that Host A sees it as 1234. Host Addressing 224 sent by Host A and intended for Host B would include the routing address 1234, which is the address Host A was told by Data Control Management Block 110 is the address of Host B.

In embodiments, Data Control Management Block 110 only acts as a result of negotiations between Host A and Host B which it facilitates. Logic within the Data Control Management Block 110 may then create reliable interpretations to each connected Host of the resulting decision.

In some embodiments, Host Addressing 224 relates to an entry in a routing table in Path Management 112. Unlike systems in which IP addresses are employed, this design ignores any external rules or even knowledge of one host of the address of another.

Figure 3:
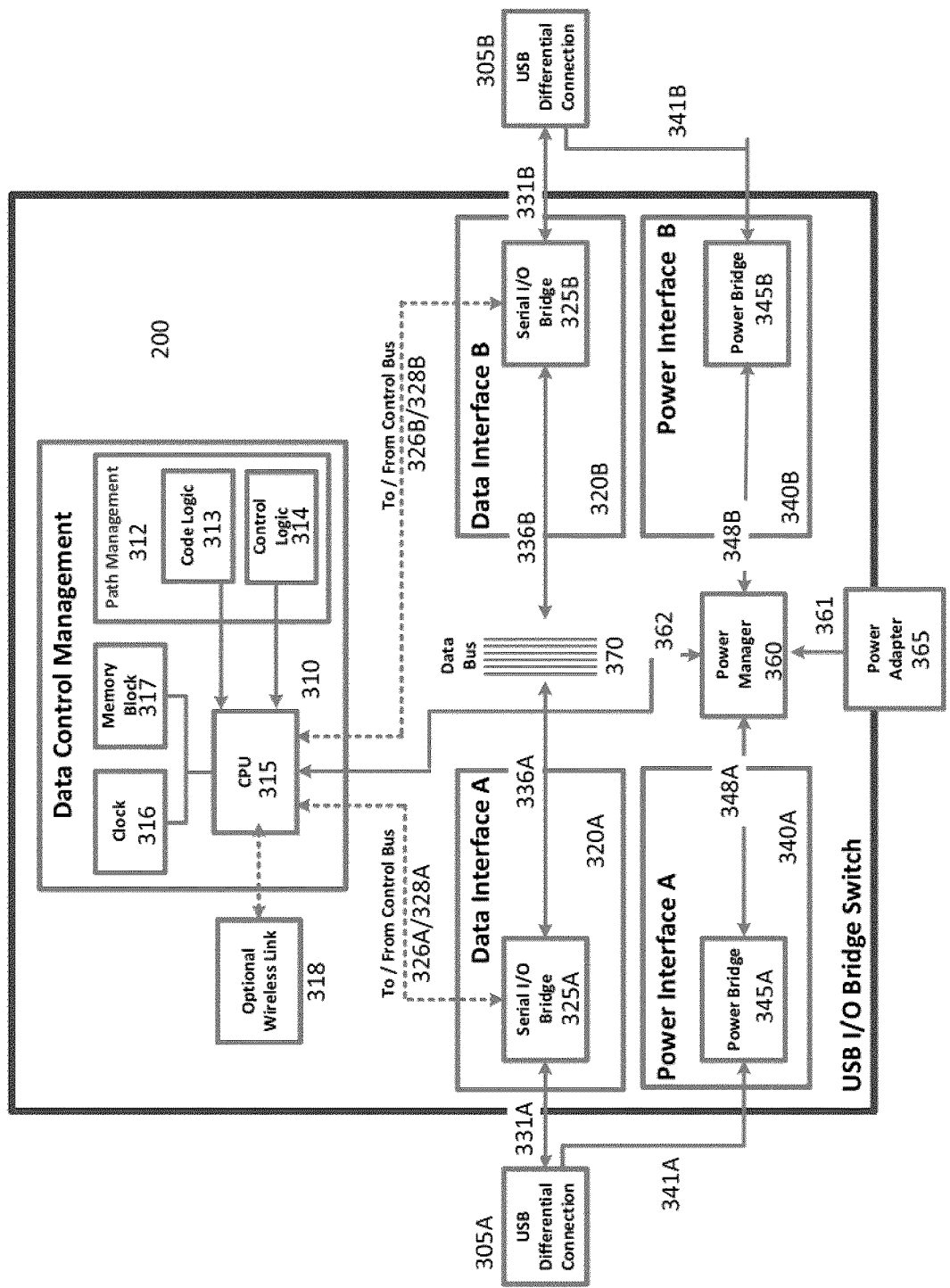
FIG. 3 illustrates, in a schematic diagram, an embodiment of an Optimized Switching Apparatus.

FIG. 3 illustrates aspects of the present application wherein a Bridge Switch Apparatus 300 employs a shared Data Control Management 310 and a virtual control link established over a physical Data Link.

FIG. 3 illustrates an embodiment of the present application wherein a USB I/O Switching Apparatus 300 may employ a single Data Control Management aspect 310 in support of two or more Data Interfaces 320A and 320B, and wherein a single physical connection for a Data Link may additionally support the establishment of a virtual Control Link required to establish a network using two or more bridged I/O transfer devices 325A and 325B.

An aspect of the present application provides that USB transmission lines 305A and 305B may be connected to Serial I/O transfer devices 325A and 325B, respectively, within Data Interface Blocks 320A and 320B, respectively; wherein a transmission is decoded and translated to machine code. Machine code marked by the Flag 225 of FIG. 2 as part of a Control Block 220 may then be collected and interpreted by a CPU 315 within the Data Control Management Block 310 over connections 326A and 326B. Accordingly, an implementation provides that the machine code may then be interpreted according to a Clock 316, Memory Block 317, and CPU 315, and according to Code Logic 313 and Control Logic 314 within a Path Management Block 312. Interpreted code may therefore establish the construct of a Control Link 328A and 328B directed at Serial I/O transfer devices 325A and 325B to affect data transfers over Data Links 336A and 336B connected to a bridging Bus 370. In an embodiment, the Data Links 336A and 336B may selectively connect to/disconnect from the Data Bus 370, as prescribed by the Data Control Management block 110 over Control Links 328A and 328B.

Provisioning of Power, as in all implementations of USB interconnects, may be derived from the USB Host system through the USB Differential Connections 305A and 305B. Power Links 341A and 341B couple with Power Interfaces 340A and 340B, respectively, containing Power Bridges 345A and 345B, respectively. Connected therefore to a Power Manager 360, power may be supplied to a CPU 315 and aspects of the Data Control Management Block 310. In situations in which additional Power is required, optional internal or external power sources may be connected or applied through the Power Adapter 365, connecting Power Manager 360 such that all systems are functioning optimally and such that any USB Host systems' data interactions are not subject to communication speed reductions.

Figure 4:
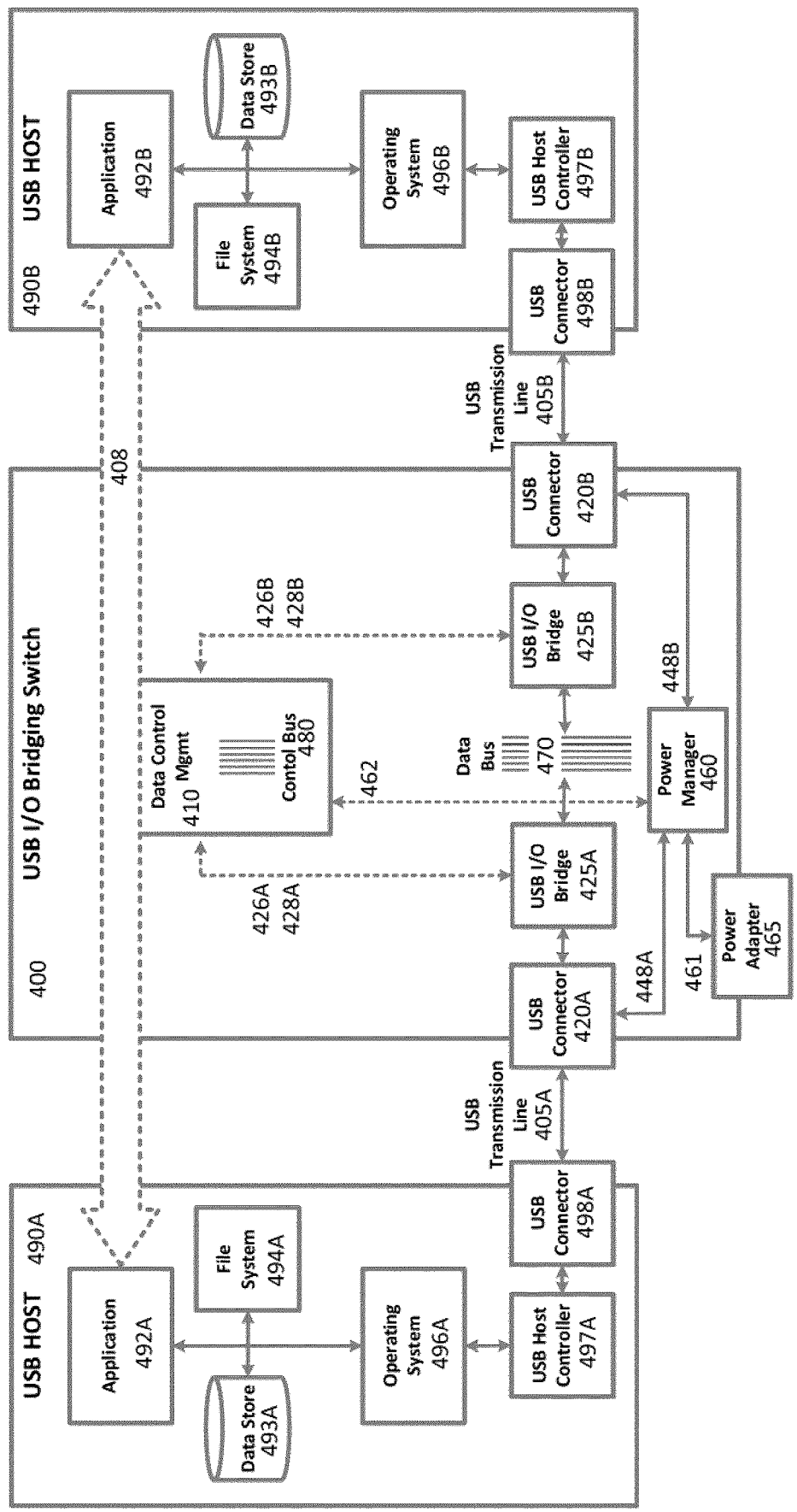
FIG. 4 illustrates, in a schematic diagram, an embodiment of a system employing a Switching Apparatus forming a Virtual Link over a Physical Link using identified Network Control Blocks embedded in a defined protocol.

FIG. 4 illustrates an end-to-end arrangement of two Hosts 490A and 490B connected by a USB I/O Bridge Switch Apparatus 400. A first USB Transmission line 405A connects a first Host 409A from its USB Connection Port 498A to USB Port 420A on the USB I/O Switching Apparatus 400. A second USB Transmission line 405B connects a second Host 490B to the USB Port 420B on the USB I/O Switching Apparatus 400.

In some embodiments, USB port detection, connection and enumeration by an eXtensible Host Controller Interface (xHCI) root host and/or an Enhanced Host Controller Interface (EHCI) root host within the USB Host Controller 497A and 497B may be handled by established USB specifications. Once connected and enumerated, aspects of USB Host systems 490A and 490B, including Operating Systems 496A and 496B, Data Stores 493A and 493B, File Systems 494A and 494B, and installed Applications 492A and 492B, work together to construct a USB Network connection 408 across the USB I/O Bridging Switch Apparatus 400.

Power for the USB I/O Bridging Switch Apparatus 400 may be provisioned from USB Connectors 420A or 420B which, according to the USB specification, may directly draw power from one or more connected Hosts, and managed by a Power Manager 460. Aspects of the application further provide that power may also or alternatively be drawn via Power Adaptor 465 from an alternate internal or external power source. Power may be managed by a CPU (not shown) in the Data Control Management Block 410 over connection 462 supporting both power and communications.

In some aspects of the present application, a Virtual Network Link 408 may be established when coupling USB Host systems 490A and 490B to the USB I/O Bridging Switch Apparatus 400, wherein Control Links 426A, 426B, 428A and 428B are established over a Data Link 470 when USB messages are decoded by USB I/O transfer devices 425A and 425B and interpreted by a Data Control Management block 410. Aspects of the application are shown wherein the effect of a Control Bus 480 is established within the Data Control Management block to meet the requirements of an established art without employing separate components, eliminating cost and complexity of construction.

Figure 5A:
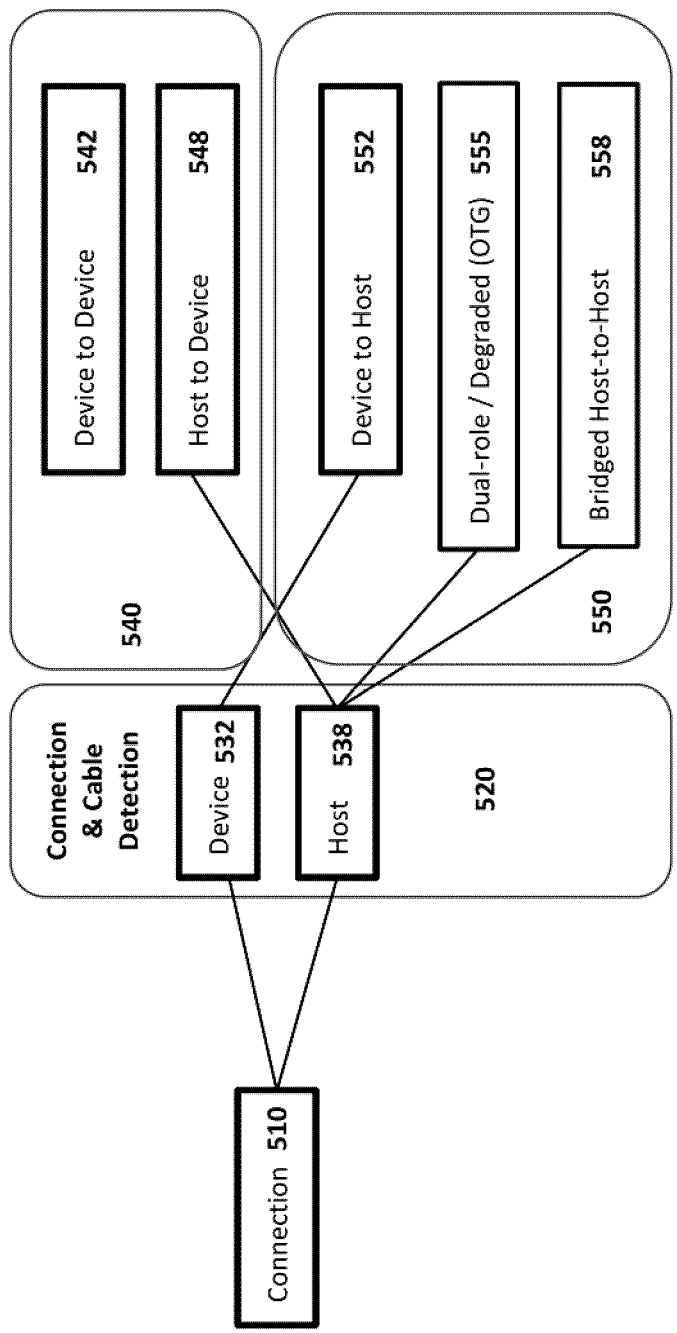
FIG. 5A illustrates, in a schematic diagram, I/O Connection Options in accordance with aspects of the present application.
Figure 5B:
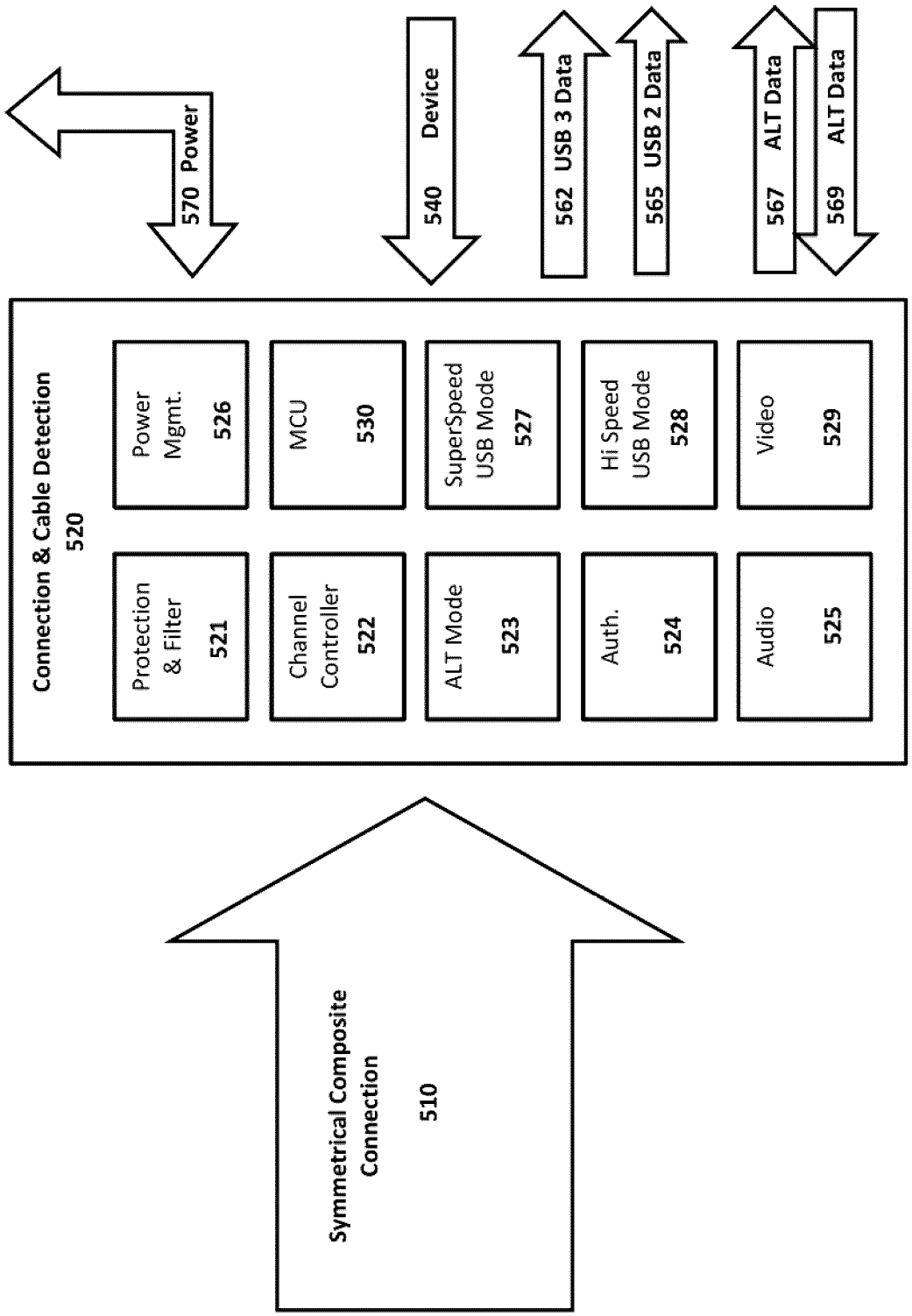
FIG. 5B illustrates, in a schematic diagram, an embodiment of an I/O Connection Detector.

Aspects of present application are explored further in FIGS. 5A and 5B wherein a method and apparatus are illustrated in schematic form, to address the challenge posed by employing a symmetrical cable such as USB Type-C wherein a connector and a port are identical for both a Host and peripheral. Absent differentiation of ports and connectors, an Upward Facing Port (UFP) and Downward Facing Port (DFP) are indistinguishable, except via explicit markings. It is therefore posited that, having established a capability to Bridge and Switch Host connections between two or more Hosts, a user will desire an integrated apparatus for all his or her connections.

FIG. 5A illustrates aspects of the present application wherein a Bridged Host-to-Host connection 558 may be a valid connection for a host 538, as determined by a USB Port Controller. It is established that a USB Connection 510 may be determined by a Port Controller 520, via established connection and cable detection aspect, as a peripheral 532 or Host 538 Connection. Aspects of USB Specifications provide for connections to peripherals, or peripheral Connections 540, such that Host-to-peripheral connections 548 are supported, whereas peripheral-to-peripheral connections are excluded. Similarly, possible connections to hosts, or Host Connections 550, are illustrated such that Host-to-peripheral 552 connections are supported as a regular prescribed use of an I/O connection. Dual Role/Degraded Host-to-Host connections 555 are expanded by the first revision of the third USB Specification, defining Power exchange roles, and USB-on-the-Go (OTG) arrangements relegating a second connected Host in the role of a peripheral.

FIG. 5B illustrates aspects of established Port Controller 520 capabilities for Connection and Cable Detection that may be employed in establishing selectable Direct Host-to-Host communications. Established by relevant USB specifications, a Symmetrical Composite Connection 510 connects to a relevant USB Port (Not Shown) wherein a connection, and cable positioning is detected and enabled across multiple roles, including Protection and Filter 521, Channel Control 522, ALT Mode 523, Authentication 524, Audio Codec Support 525, Video Codec Support 529, Hi-Speed USB Mode 528, SuperSpeed USB Mode 527, a component Micro Controller Unit (MCU) 530 and Power Management 526.

Accordingly, Power 570 may be exchanged between a connected Host or peripheral and bridging Apparatus via a defined Port Controller 520. Bridging apparatus communications 540 are equally supported and directed to a connected Host. Similarly, USB 3 Data 562 and USB 2 Data 565 communications are supported, as well as inbound and outbound ALT connections 567 and 569.

Figure 6A:
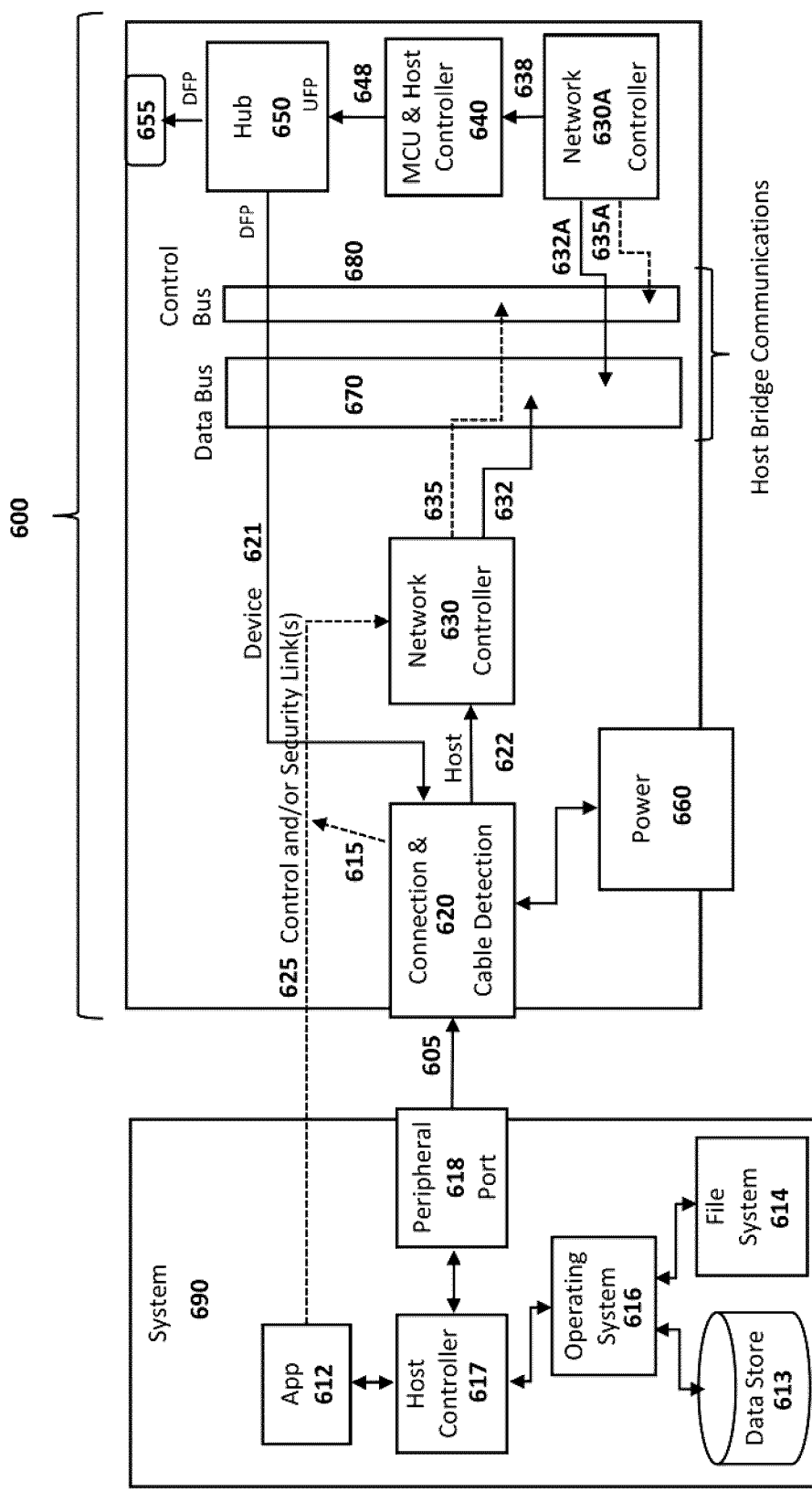
FIG. 6A illustrates, in a schematic diagram, an embodiment of a Sensing I/O Bridging Hub Switch wherein a Detector detects Host and Peripheral connections, and an embedded Host Controller shares peripheral connections over a bridging bus.

FIG. 6A illustrates a Sensing I/O Bridging Hub Switch 600, employing aspects of a defined Port Controller, wherein a Connection and Cable Detection block 620 determines routing for both Host and peripheral connections. An aspect of the present application is shown wherein a Host System 690 connects to a Sensing I/O Bridging Hub Switch 600 over a Symmetrical Cable 605, for example a USB Type-C Cable. Aspects of a Host System 690, including Peripheral Port 618, Host Controller 617, Operating System 616, Data Store 613, File System 614 and an enabling Application 612. The enabling Application 612 interacting with a Sensing I/O Bridging Hub Switch 600 as previously established in the LINKS Patent.

Powered by a USB Connection 605, or alternatively via an externally supplied Power source 660, Connection and Cable Detection block 620 establishes a USB peripheral Connection 621 via a Downward Facing Port of an internal Hub 650 or, alternatively, a Host Connection 622 to a USB Network Controller 630. As established in the LINKS Patent, a Network Controller establishes a Data Connection 632 to a Bridging Data Bus 670, and a Control Connection 635 to a Bridging Control Bus 680. A Control and/or Security Link 625 is furthermore established between an Application 612 in an attached System 690 and a Network Controller 630, whereas the Control Link may be constructed either physically or virtually according to the present application and described herein.

In an embodiment of the present application, a second Network Controller 630A may be included in a Sensing I/O Bridging Hub Switch, subsequently connecting to an embedded Host Controller 640 over a connection 638, to a shared bridging Data Bus 670 over 632A and further to a shared bridging Control Bus 680 over a connection 635A. An MCU and Host Controller 640 is further affixed to the Internal Hub 650 via an Upward Facing Port, completing the necessary links.

In operation, USB peripheral or Host connections may therefore be supported, including Bridged Host-to-Host network connections, in addition to the aforementioned connection types specified by an applied protocol regime. An Upward Facing Port may be further acknowledged by a Host System 690 as shared by a MCU and Host Controller 640 within a Sensing I/O Bridging Hub Switch 600 according to the LINKS Patent. Additional peripherals 655 are furthermore connected to one or more Downward Facing Ports on the Hub 650, and enumerated on an embedded MCU and Host Controller 640 according to relevant specifications. As provided by the LINKS Patent, these peripherals may then be shared, switched or delegated to subsequent Host Systems also connected to a shared Bridging Data Bus and Control Bus.

Figure 6B:
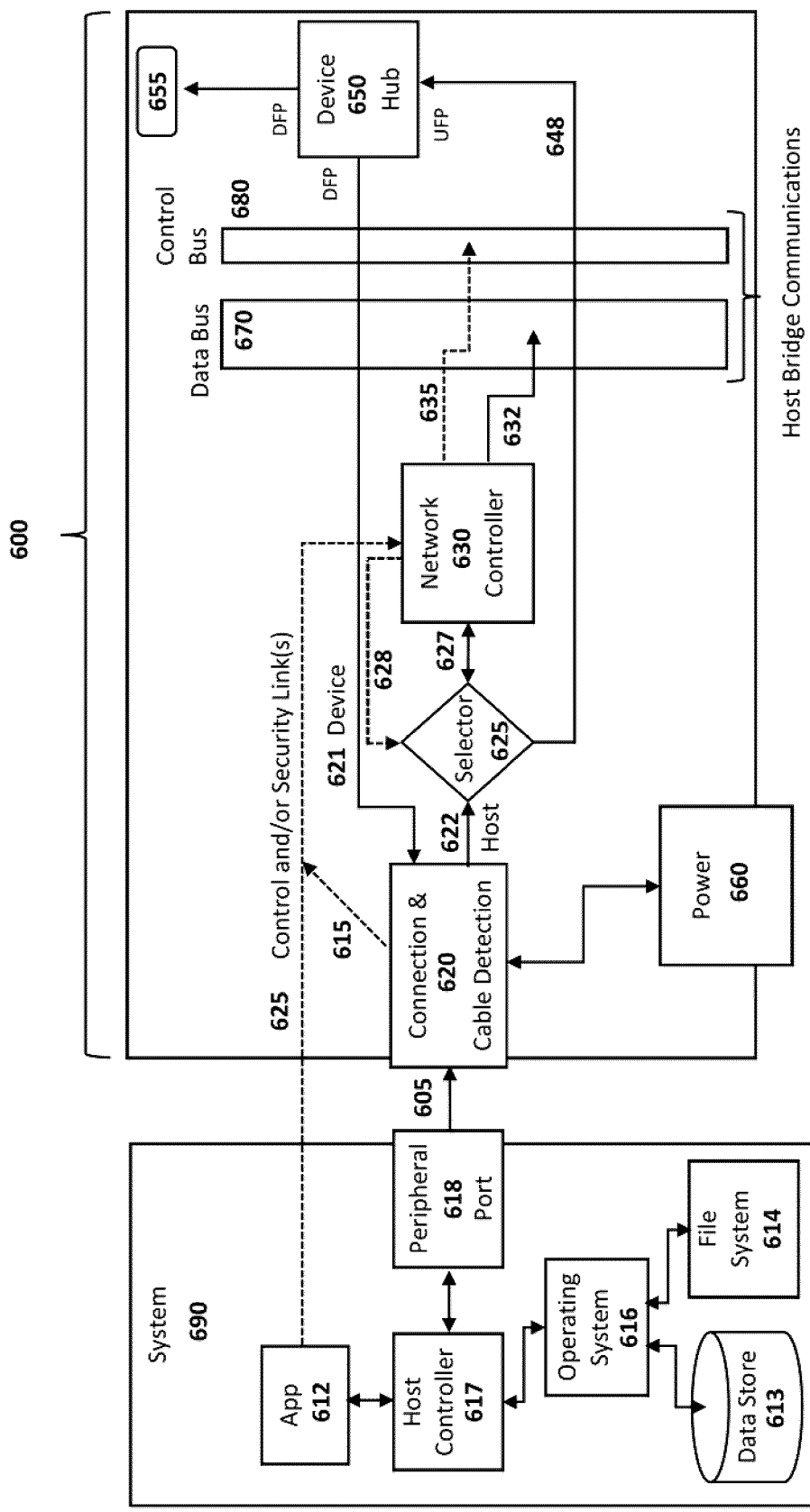
FIG. 6B illustrates, in a schematic diagram, an embodiment of a Sensing I/O Bridging Hub Switch wherein a Detector detects Host and Peripheral connections, and a Host connection uses a Selector to establish either a bridged Host connection or a UFP connection to a Hub.

FIG. 6B illustrates a Sensing I/O Bridging Hub Switch 600, employing aspects of a defined Port Controller, wherein a Connection and Cable Detection block 620 determines routing for both Host and peripheral connections. An aspect of the present application is shown wherein a Host System 690 connects to a Sensing I/O Bridging Hub Switch 600 over a Symmetrical Cable 605, for example a USB Type-C Cable. Aspects of a Host System 690, including Peripheral Port 618, Host Controller 617, Operating System 616, Data Store 613, File System 614 and an enabling Application 612. Application 612 interacts with a Sensing I/O Bridging Hub Switch 600 as previously established in the LINKS Patent.

Powered by a USB Connection 605, or alternatively via an externally supplied Power source 660, Connection and Cable Detection block 620 establishes a USB peripheral Connection 621 via a Downward Facing Port of an internal Hub 650 or, alternatively, a Selector 625 over a Host Connection 622. In one aspect of the present application a Selector 625 offers alternate connections to either a USB Network Controller 630 or an Upward Facing Port of Hub 650. As described in the LINKS Patent, a Network Controller establishes a Data Connection 632 to a Bridging Data Bus 670, and a Control Connection 635 to a Bridging Control Bus 680. A Control and/or Security Link 625 is furthermore established between an Application 612 in an attached System 690 and a Network Controller 630, whereas the Control Link may be constructed either physically or virtually according to the present application and described herein.

In operation, USB peripheral or Host connections may be supported, including Bridged Host-to-Host network connections, in addition to the aforementioned connection types specified by an applied protocol regime. An Upward Facing Port may be further employed by a Host System 690, temporarily or alternatingly, following a determination of selected path by a Selector 625. Initially defaulting to provide a connection 627 to a Network Controller 630, a Selector 625 may further be instructed, according to a direction over Control Links 625 and 628, to establish a connection 648 to the Upward Facing Port of an internal Hub 650. Additional peripherals 655 are furthermore connected to one or more Downward Facing Ports on the Hub 650, and enumerated on System Host 690 according to relevant specifications. As provided by the LINKS Patent, these peripherals may then be shared, switched or delegated to subsequent Host Systems also connected to a shared Bridging Data Bus and Control Bus.

Figure 6C:
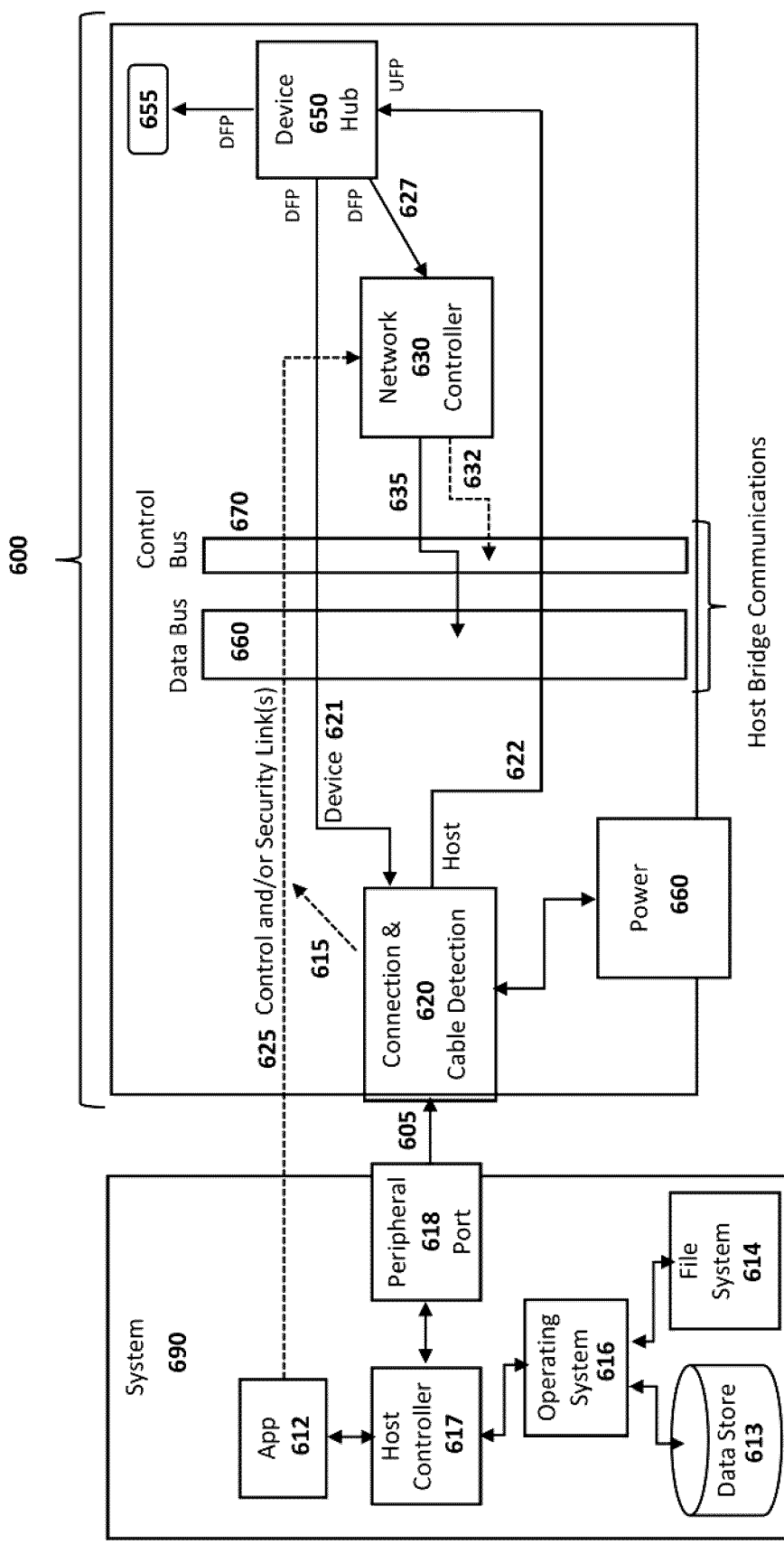
FIG. 6C illustrates, in a schematic diagram, an embodiment of a Sensing I/O Bridging Hub Switch wherein a Detector detects Host and Peripheral connections to connect a Host to the UFP of a hub to establish both Peripheral connections and a bridged Host connection.

FIG. 6C illustrates a further embodiment of the present application wherein a Sensing I/O Bridging Hub Switch 600, employs aspects of a defined Port Controller, wherein a Connection and Cable Detection block 620 determines routing for both Host and peripheral connections. An aspect of the present application is shown wherein a Host System 690 connects to a Sensing I/O Bridging Hub Switch 600 over a Symmetrical Cable 605, for example a USB Type-C Cable. Aspects of a Host System 690, including Peripheral Port 618, Host Controller 617, Operating System 616, Data Store 613, File System 614 and an enabling Application 612. Application 612 interacts with a Sensing I/O Bridging Hub Switch 600 as previously established in the LINKS Patent.

Powered by a USB Connection 605, or alternatively via an externally supplied Power source 660, Connection and Cable Detection block 620 establishes a USB peripheral Connection 621 via a Downward Facing Port of an internal Hub 650 or, alternatively, an Upward Facing Port of an internal Hub 650. A Network Controller 630 may therefore be coupled to a Downward Facing Port on the Internal Hub 650 and further establish a Data Connection 632 to a Bridging Data Bus 670, and a Control Connection 635 to a Bridging Control Bus 680. A Control and/or Security Link 625 is furthermore established between an Application 612 in an attached System 690 and a Network Controller 630, whereas the Control Link may be constructed either physically or virtually according to the present application and described herein.

In operation, USB peripheral or Host connections may be supported, including Bridged Host-to-Host network connections, in addition to the connection types specified by an applied protocol regime, for example USB. An Upward Facing Port, for example, may be further employed by a Host System 690, temporarily or alternatingly, according to a direction over a Control Links 625, via a connection 627 on a Downward Facing Port of an internal Hub 650. In an embodiment of the present application, FIG. 6C further illustrates a Network Controller 630 connecting to a shared bridging Data Bus 670 over 635 and further to a shared bridging Control Bus 680 over a connection 632. Additional peripherals 655 are furthermore connected to one or more Downward Facing Ports on the Hub 650, and enumerated on System Host 690 according to relevant specifications. As provided by the LINKS Patent, these peripherals may then be shared, switched or delegated to subsequent Host Systems also connected to a shared Bridging Data Bus and Control Bus.

Figure 7:
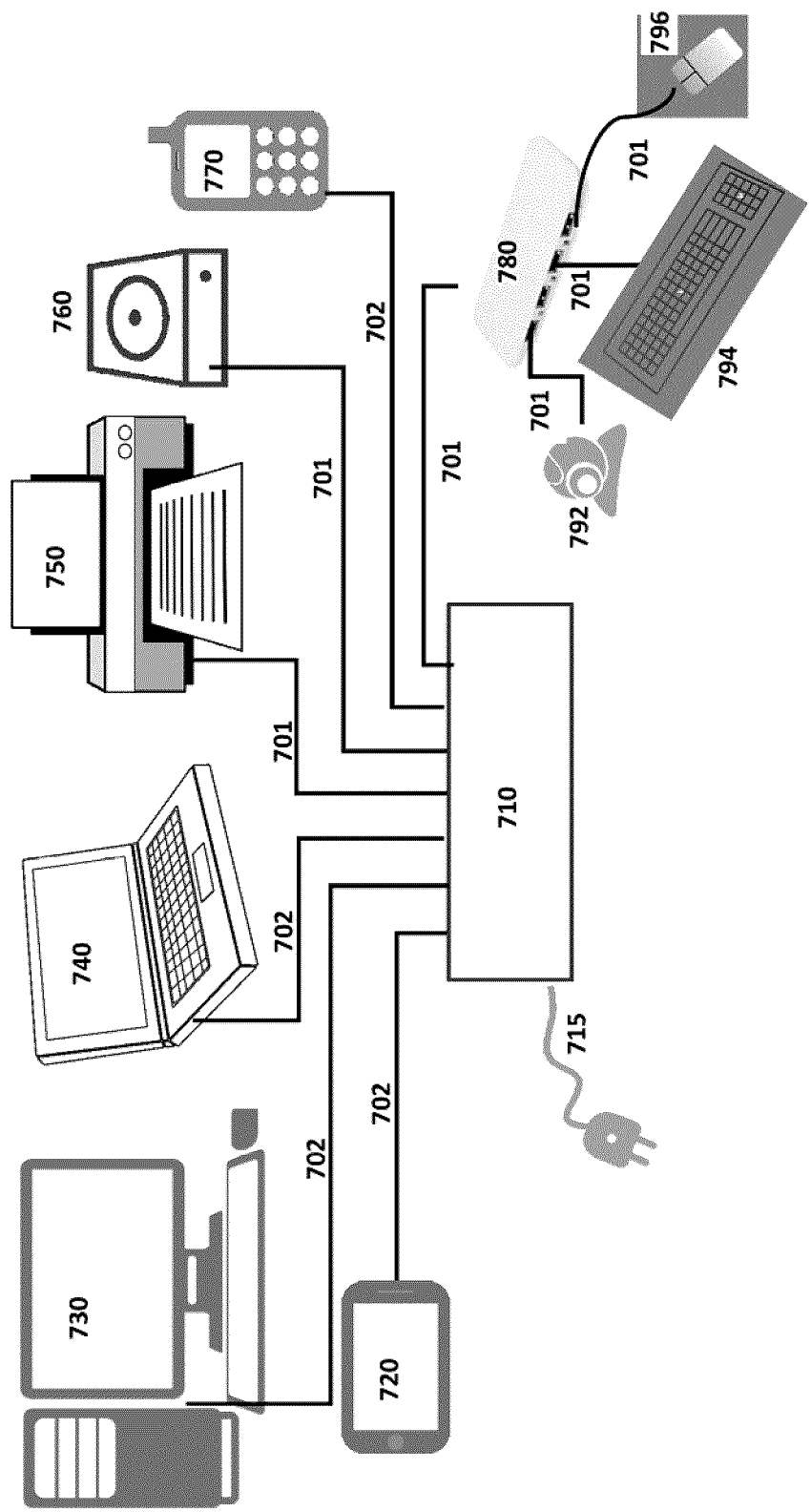
FIG. 7 illustrates a schematic of Hosts and Peripherals connected over an embodiment of a Sensing Host Device Hub Switch.

FIG. 7 illustrates aspects of the present application wherein connected Host Systems and peripherals may be attached to a Sensing Host Device Hub Switch 710 on any port. Host Connections 702 and peripheral Connections 701 may equally employ any sensing port which, upon connection, senses the nature of each connection and employs one or more of the aspects herein to establish a correct connection defined in a relevant specification, such as USB.

Accordingly, a PC 730, Laptop 740, Tablet 720, and Cellphone 770 may connect as hosts to any symmetrical port in a Sensing Host Device Hub Switch 700, and further negotiate the formation of a data network amongst themselves, as established in the LINKS Patent. Furthermore, connected Host systems may further share, switch or be delegated control of any connected peripheral, both directly or indirectly via one or more connected Hub 780. One or more peripherals may further connect to any sensing port; for example, a Printer 750, an external Hard Drive 760, a Video Cam 792, a Keyboard 794, a Mouse 796 or any other compliant peripheral (not shown).

Power may be provided by one or more connected Host Systems or an external source 715, as provided by a relevant specification. Further, a connected Host may also draw power from a Sensing Host Device Hub Switch 710 as provided by a relevant specification, for example a dual role port defined by USB.

Aspects of the present application further support that any connected peripheral may be furthermore shared or switched as provided by a referenced art.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description and all changes which come within the meaning and range of equivalency of the claims are therefore intended to be embraced therein.

The invention claimed is:

1. A system for transferring data between a first host computer and a second host computer comprising:
   a first host computer capable of sending and receiving data and control information;
   a second host computer capable of sending and receiving data and control information; a bridging apparatus including at least two I/O transfer devices arranged in bridge formation providing for an exchange of data over a shared bus; and
   wherein the first and second hosts form a data connection through the bridging apparatus, and transfer of data between the host computers across the bridging apparatus is determined by the host computers such that neither host computer directs the entire transfer; and
   wherein the first host computer and the second host computer each comprise installed software, which, when excited, establishes a network between the first host computer and the second host computer and provides for the transfer of data and control information over the bridging apparatus.

2. The system of claim 1, wherein a control path is created over the established data connection using identifiable communication tokens exchanged between the first host computer and the second host computer to differentiate and establish control communications.

3. The system of claim 1, wherein the installed software establishes a network and control manager adapted to create a temporary interconnection between the first host computer and the second host computer and to establish addressing and a data manager adapted to transact data and file transfers between the first host computer and the second host computer.

4. The system of claim 1, further comprising a third and subsequent host computer.

5. A data switching apparatus comprising:
   two or more input/output (I/O) ports, each associated with an I/O device bridge controller and a detector capable of detecting whether a device coupled to the I/O port through a connector is a host device or a peripheral device;
   a shared data bus communicatively coupled to each I/O device bridge controller; and
   a shared central processing unit and memory, with a means for receiving power, the shared central processing unit and memory communicatively connected to each I/O device bridge controller through the I/O device bridge controller's control link, wherein the data switching apparatus is capable of selectively designating each port an upward facing port (UFP) if the I/O device bridge controller's detector detects a host and a downward facing port (DFP) if the I/O device bridge controller's detector detects a peripheral; and
   wherein each I/O device bridge controller is configured to establish a network between the devices.

6. The data switching apparatus of claim 5, wherein a control path is established over an established data path using identifiable fixed or variable message blocks interpreted by a central processing unit and memory to affect network control at each I/O device bridge controller.

7. The data switching apparatus of claim 5, wherein a device hub is connected, via an upstream embedded host controller coupled to a shared data bus using a I/O device bridge controller.

8. The data switching apparatus of claim 5, wherein a device hub is connected to a host computer over a determined port connector, and further having a downstream I/O device bridge controller connected to a shared bridging bus.

9. The data switching apparatus of claim 5, wherein a device hub is connected to a host computer via a selector.

10. A method for transferring data between a first host computer and a second host computer comprising:
    communicatively coupling a first input/output (I/O) device controller to a first host computer;
    communicatively coupling a second I/O device controller to a second host computer; establishing a virtual control link between the first I/O device controller and the second I/O device controller, the virtual control link configured to establish a network;
    establishing a data link between the first I/O device controller and the second I/O device controller; and
    transferring data from the first host computer to the second host computer by communicating the data to the first I/O device controller and then over the data link to the second I/O device controller and then to the second host computer.

11. The method of claim 10, wherein the data is communicated over the data link using USB protocol.

12. The method of claim 10, further comprising the first host computer using a resource of the second host computer over the network by logical direct access.

13. The method of claim 12, wherein the resource comprises a peripheral device.

14. The method of claim 12, wherein the resource comprises a host resource.

15. The method of claim 1, wherein the first host computer or second host computer is a single processor unit.

* * * * *